United States Patent
Schwalm

(10) Patent No.: US 7,654,588 B2
(45) Date of Patent: Feb. 2, 2010

(54) PIPE CONNECTION HAVING IMPROVED STRENGTH

(75) Inventor: Dieter Schwalm, Oerlinghausen (DE)

(73) Assignee: VULKAN Lokring Rohrverbindungen GmbH & Co. KG, Herne (DE)

( * ) Notice: Subject to any disclaimer, the term of this patent is extended or adjusted under 35 U.S.C. 154(b) by 95 days.

(21) Appl. No.: 11/667,907

(22) PCT Filed: Oct. 8, 2005

(86) PCT No.: PCT/EP2005/010864

§ 371 (c)(1),
(2), (4) Date: May 16, 2007

(87) PCT Pub. No.: WO2006/053609

PCT Pub. Date: May 26, 2006

(65) Prior Publication Data

US 2008/0122223 A1    May 29, 2008

(30) Foreign Application Priority Data

Nov. 17, 2004 (DE) .................. 10 2004 055 537

(51) Int. Cl.
*F16L 13/14* (2006.01)
(52) U.S. Cl. .................. 285/382.2; 29/508; 29/515
(58) Field of Classification Search ................ 285/242, 285/256, 382, 382.1, 382.2; 29/508, 515, 29/516

See application file for complete search history.

(56) References Cited

U.S. PATENT DOCUMENTS

| | | | |
|---|---|---|---|
| 1,926,270 A * | 9/1933 | Eastman | 285/256 |
| 3,893,720 A * | 7/1975 | Moebius | 285/187 |
| 4,026,006 A | 5/1977 | Moebius | |
| 4,061,367 A | 12/1977 | Moebius | |
| 4,598,938 A * | 7/1986 | Boss et al. | 285/382.2 |
| 4,705,302 A * | 11/1987 | Beiley | 285/47 |
| 4,793,638 A * | 12/1988 | Baldwin, Jr. | 285/148.13 |
| 4,858,968 A * | 8/1989 | Moebius | 285/382.2 |
| 4,911,484 A | 3/1990 | Hackforth | |
| 5,181,752 A * | 1/1993 | Benson et al. | 285/81 |
| 5,346,262 A * | 9/1994 | Liebig | 285/23 |
| 5,470,113 A | 11/1995 | Schwalm et al. | |
| 5,868,435 A * | 2/1999 | Bartholomew | 285/23 |

(Continued)

FOREIGN PATENT DOCUMENTS

DE      38 37 359       7/1989

(Continued)

*Primary Examiner*—James M Hewitt
(74) *Attorney, Agent, or Firm*—Collard & Roe, P.C.

(57) ABSTRACT

A pipe connection includes a metal locking ring which can be pushed onto the external pipe of two interlocking metal pipes to connect the latter. The inner face of the locking ring has a leading section that tapers conically in a radial direction in opposition to the direction of application; a trailing section that tapers conically in a radial direction in opposition to the direction of application and that causes the pipe to be radially compressed, when the ring is in the locking position; and a central section lying between the leading section and the trailing section. A central section with a conical configuration improves a pipe connection of this type so that the tensile strength of heavy duty pipe connections or pipe connections consisting of pipes of material with low elasticity becomes mechanically more stable.

2 Claims, 6 Drawing Sheets

U.S. PATENT DOCUMENTS

| | | | |
|---|---|---|---|
| 6,049,962 A * | 4/2000 | Pfeiffer | 29/515 |
| 6,367,850 B1 * | 4/2002 | Thrift et al. | 285/382 |
| 6,715,800 B1 * | 4/2004 | Hennig | 285/259 |
| 2005/0012328 A1 * | 1/2005 | Baving et al. | 285/242 |
| 2005/0264006 A1 * | 12/2005 | McKay | 285/256 |
| 2006/0284415 A1 * | 12/2006 | McKay | 285/256 |
| 2007/0108760 A1 * | 5/2007 | McKay | 285/256 |

FOREIGN PATENT DOCUMENTS

| | | |
|---|---|---|
| DE | 3815492 A1 * | 11/1989 |
| DE | 44 12 615 | 11/1994 |
| GB | 2217416 A * | 10/1989 |

* cited by examiner

PIPE CONNECTION HAVING IMPROVED STRENGTH

CROSS REFERENCE TO RELATED APPLICATIONS

Applicant claims priority under 35 U.S.C. §119 of German Application No. 10 2004 055 537.0 filed Nov. 17, 2004. Applicant also claims priority under 35 U.S.C. §365 of PCT/EP 2005/010864 filed Oct. 8, 2005. The international application under PCT article 21 (2) was not published in English.

BACKGROUND OF THE INVENTION

1. The Field of the Invention

The present invention relates to a pipe connection having a metallic clamping ring which, for the purpose of connecting two metallic pipes that have been inserted one into the other, can be pushed axially onto the pipe that lies on the outside, whereby the clamping ring, on its inside, a) has an entry segment that narrows radially and conically, counter to the push-on direction, b) has an end segment that narrows radially and conically, counter to the push-on direction, which segment brings about radial compression of the pipes, in the assembled position, and c) has a center segment disposed between entry segment and end segment.

2. The Prior Art

Such a pipe connection is known from the German patent DE 38 37 359 C2.

Pipe connections of the present type serve to mechanically connect two metallic pipes with one another and, at the same time, to seal this connection. For this purpose, the pipes are inserted one into the other, and braced together by means of axially pushing on the clamping ring. So that the pipes can be inserted one into the other, the pipe lying on the outside must have a greater inside diameter than the outside diameter of the inner pipe. Fundamentally, it is therefore possible to either join two pipes having different rated diameters, or to join two pipes having the same diameter, whereby the end segment of one pipe must be widened in the region of the connection.

The previously known pipe connection according to the cited patent has proven itself in excellent manner in most cases of application. However, it has turned out that in two specific cases of application, the mechanical strength of the previously known connection requires improvement: for one thing, the torsion strength and tensile strength of the connection of two pipes made of a softer, less elastic metal such as a soft aluminum alloy, for example, is unsatisfactory; for another thing, in the case of steel pipes to which a high internal pressure is applied, a reduction in the holding forces is observed.

SUMMARY OF THE INVENTION

The present invention is therefore based on the task of further developing the pipe connection of the type stated initially, in such a manner that even pipes made of softer materials, or pipes having a high internal pressure, can be reliably and durably joined and sealed.

This task is accomplished in that the center segment is configured conically.

The conical configuration of the center segment can take place in two different ways, namely in such a manner that the center segment narrows or widens counter to the push-on direction. The first configuration variant is particularly practical if joining soft materials is the matter of concern. The deformation of the pipes takes place over a longer region, so that a more harmonious distribution of stresses occurs in the connection. The deformation no longer takes place only at certain points and plastically in the region of the end segment, but rather also elastically in the region of the center segment, so that the pipes are joined with a force fit there.

In particular, the conical center segment should be dimensioned in such a manner that the pipes are deformed in the plastic region in the transition region between center segment and end segment. Thus, a seamless transition from the elastic to the plastic region of the pipes is created.

The second configuration variant, which is characterized by a center segment that widens counter to the push-on direction, is particularly practical for joining pipes subject to internal pressure and having greater elasticity. Widening relieves stress on the connection in the region of the center segment, and results in a spring-back effect, which brings about wave-shaped anchoring of the two pipes in the case of subsequent increased stress at the end segment. Furthermore, the assembly forces are lowered, particularly when joining pipe materials having great strength and greater wall thickness.

The entry segment of the clamping ring can be divided, in advantageous manner, into two consecutive partial segments that narrow radially and conically counter to the push-on direction, whereby the first partial segment, disposed on the opening side, must have a greater incline than the second partial segment. By means of this measure, pushing on the clamping ring is significantly facilitated.

On its outside, in the region of the center segment, the clamping ring can advantageously be provided with a circumferential constriction. This promotes an elastic deformation of the ring in the region of the center segment, which leads to greater strength of the connection.

BRIEF DESCRIPTION OF THE DRAWINGS

The present innovation will now be explained in greater detail using exemplary embodiments. For this purpose, the figures show.

DETAILED DESCRIPTION OF THE DRAWINGS

Figure 1:
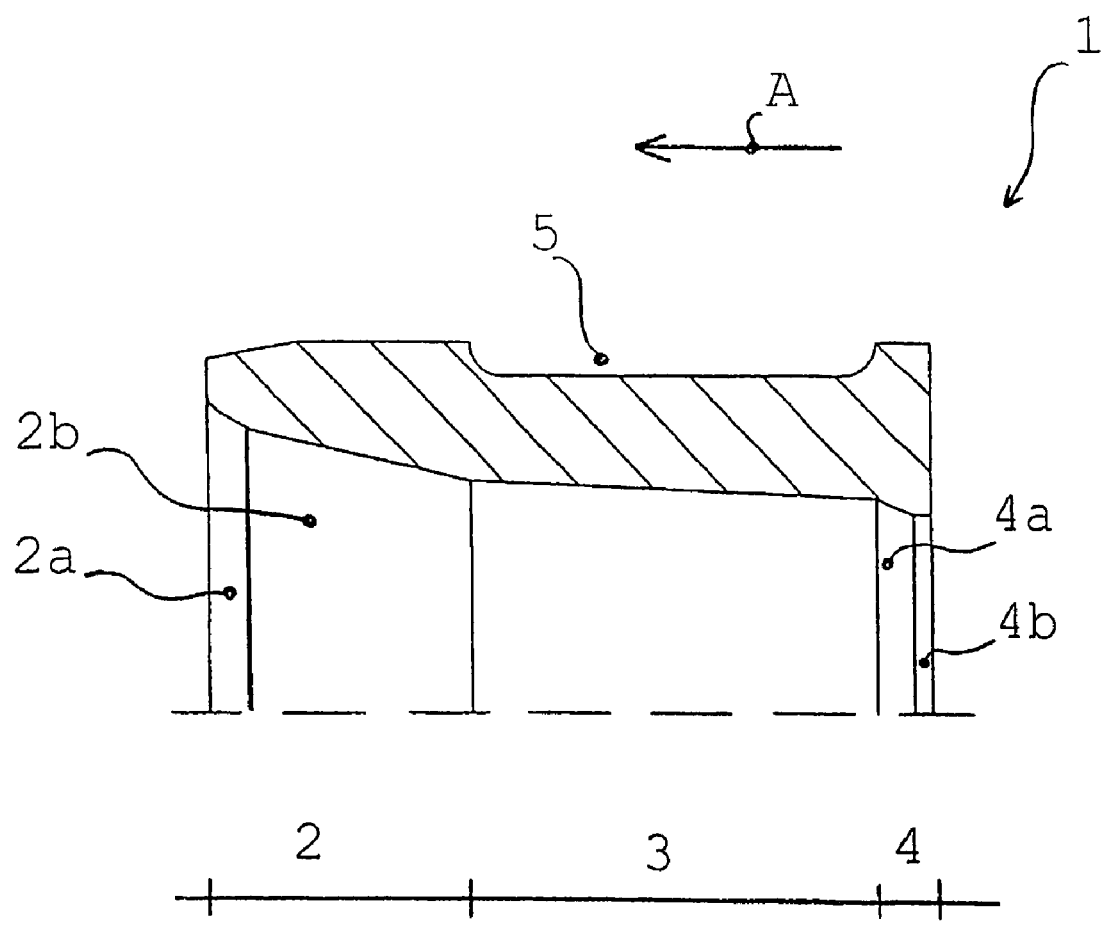
FIG. 1: clamping ring, first configuration variant.

A first configuration variant of the clamping ring 1 is shown in FIG. 1, in longitudinal section. On its inside, the clamping ring 1 has three functional main segments, which follow one another along its longitudinal axis, counter to the push-on direction A. An entry segment 2 is disposed on the opening side, ended by a center segment 3. The inside contour is ended at its end by an end segment 4.

The entry segment 2 in turn is composed of two partial segments, a first partial segment 2a disposed on the opening side, and a subsequent second partial segment 2b. The two partial segments 2a, 2b narrow conically, whereby the first partial segment 2a has a greater incline than the second partial segment 2b.

The center segment 3 also narrows conically. However, the incline is clearly less than that of the entry segments 2a, 2b. The end segment 4 is also divided into two parts, namely into a reduction segment 4a that narrows radially and conically, and a comparatively short cylinder segment 4b. The great incline of the reduction segment 4a serves to radially compress the pipes in the assembled position, partially all the way into the plastic region. The cylindrical segment 4b imprints its inside diameter onto this constriction. Here, the seal occurs once the connection has been joined. On its outside, the clamping ring 1 is provided with a circumferential constriction, which extends in the region of the center segment 3.

Figure 2:
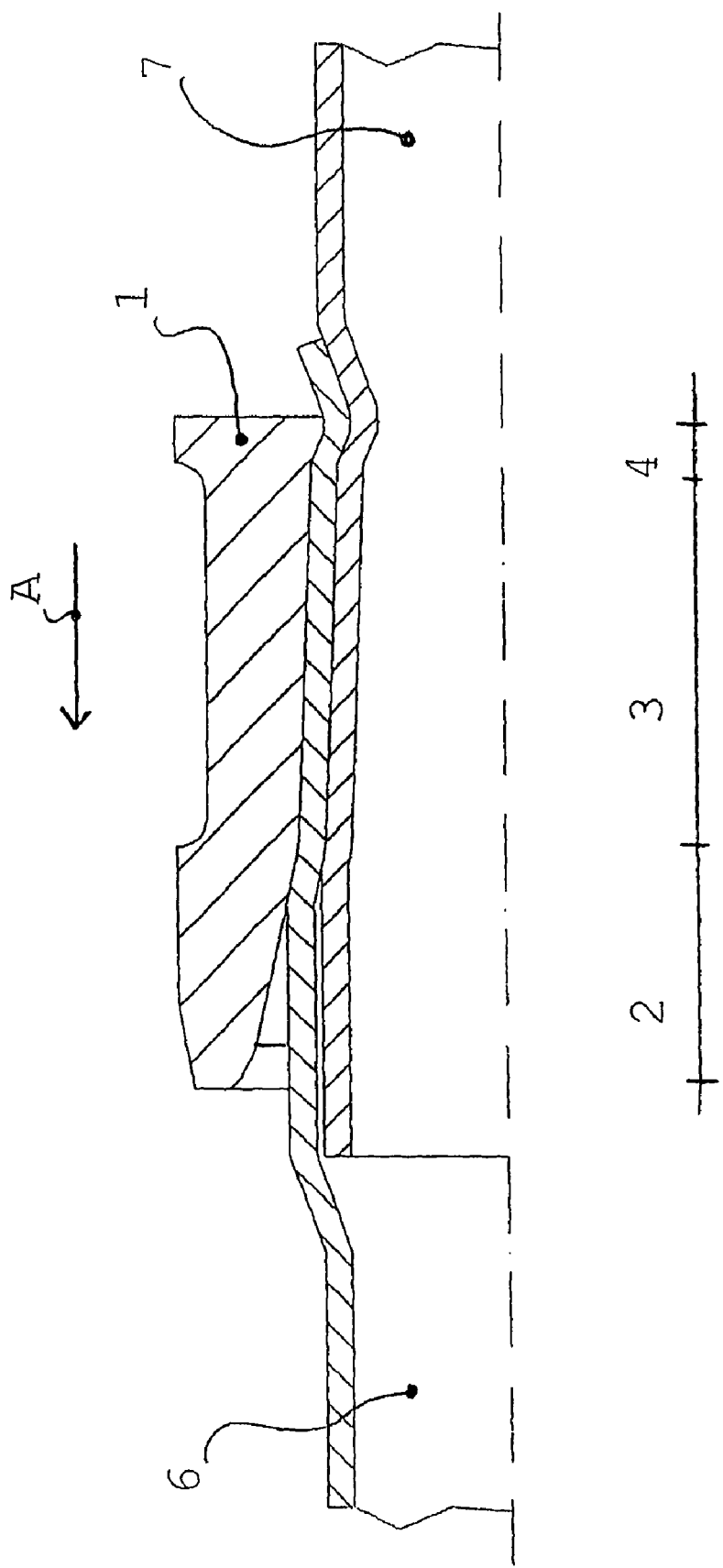
FIG. 2: pipe connection having a widened pipe and clamping ring from FIG. 1.

FIG. 2 shows a pipe connection of two pipes 6, 7 with the clamping ring 1 of the first configuration variant in the assembled position. The clamping ring 1 is pushed onto the outer pipe 6 in the push-on direction A, and brings about a radial compression of the pipes 6, 7. In the region of the center segment 3, the pipes 6, 7 are deformed in the elastic region, which makes a transition into plastic deformation in the border region to the end segment 4. In the end segment 4 itself, complete plastic deformation prevails, which leads to a true shape fit between the pipes 6 and 7. The connection is therefore non-releasable. The pipes 6 and 7 shown in FIG. 2 have the same inside diameter. In order for them to be inserted one into the other in the region of the clamping ring 1, the pipe 6 has first been widened there.

Figure 3:
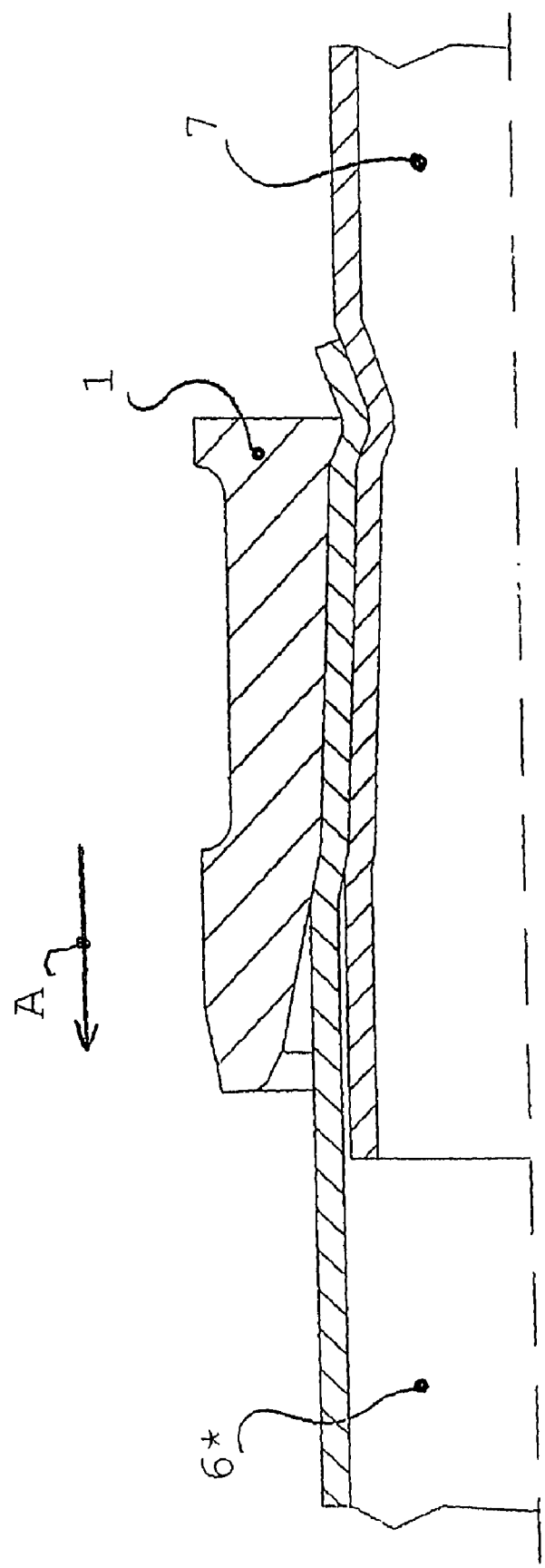
FIG. 3: pipe connection having pipes of different diameter and clamping ring from FIG. 1.

Nevertheless, it is possible to join two pipes 6*, 7 that have a different inside diameter. Thus, the outer pipe 6* shown in FIG. 3 has a clearly greater diameter than the inner pipe 7, so that it does not have to be specially widened. However, the deformation behavior described above is the same.

Figure 4:
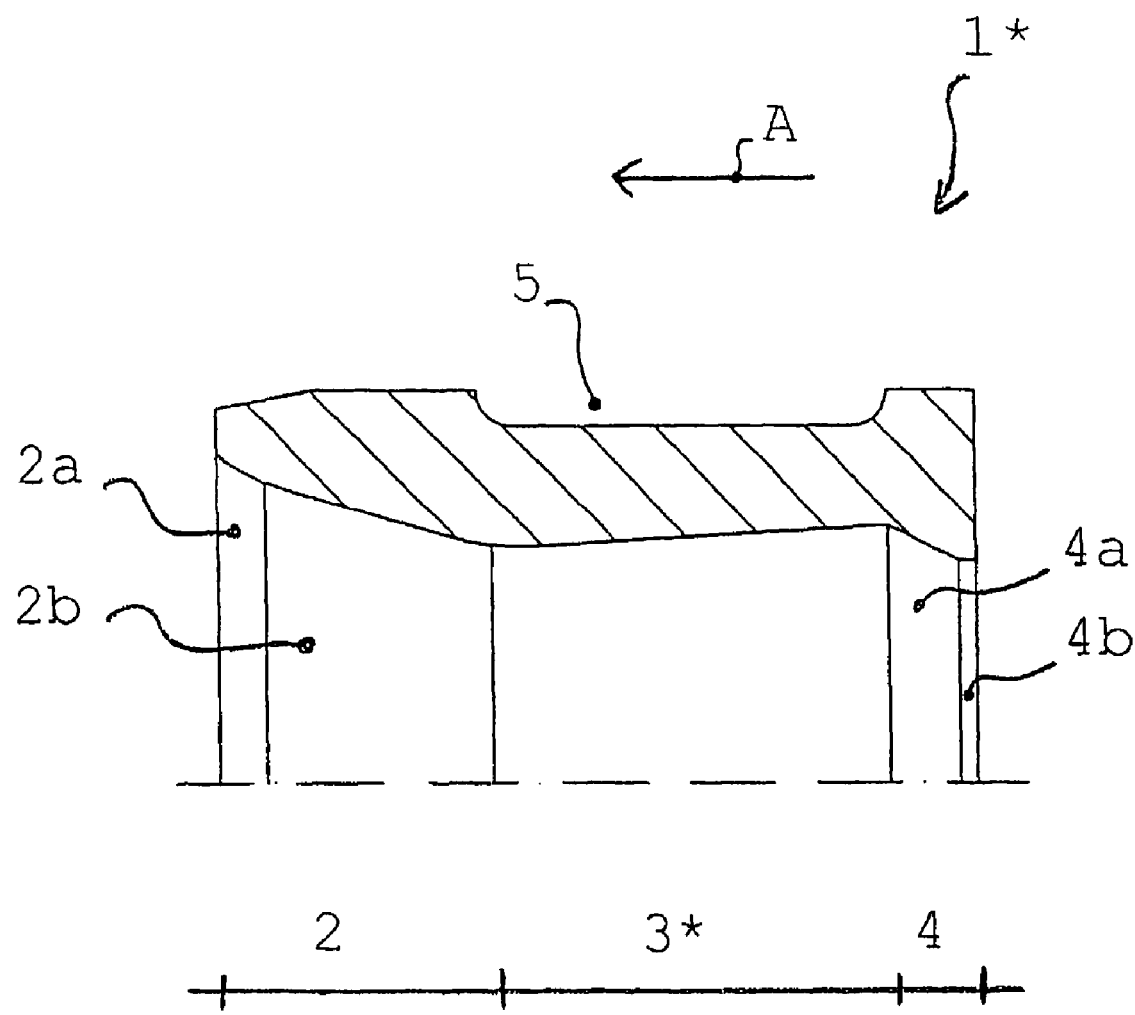
FIG. 4: clamping ring, second configuration variant.

FIG. 4 shows a second configuration variant of the clamping ring 1*. This differs from the first configuration variant 1 by the center segment 3*, which widens conically counter to the push-on direction A. When the clamping ring 1* is pushed on, the pipes are first compressed by way of the center segment 2, and immediately afterward, the stress is relieved on them again in the center segment 3*, and finally, in the end segment 4, they are reduced again. In the assembled position, an approximately wave-shaped stress profile therefore develops, which has a positive effect on the strength of high-pressure pipe connections, in particular.

Figure 5:
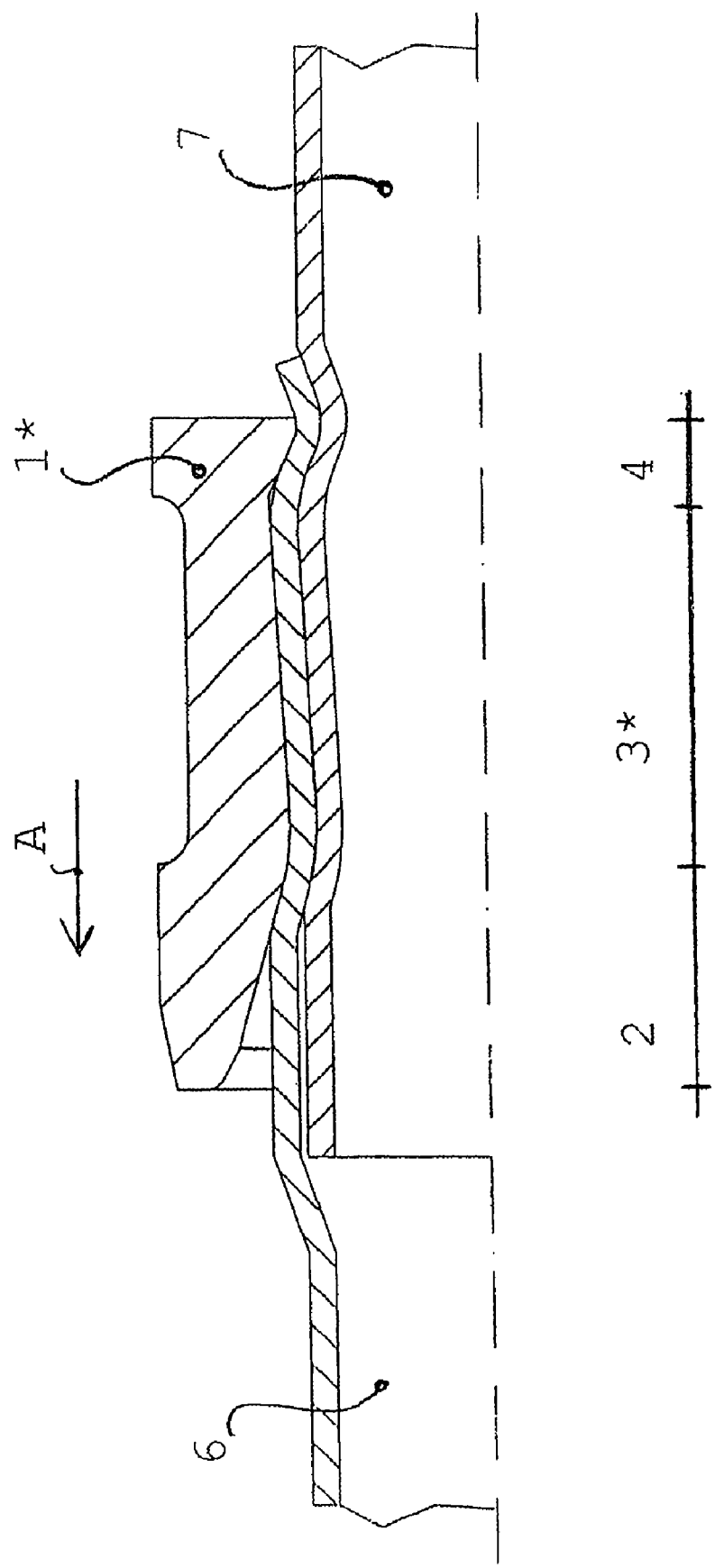
FIG. 5: pipe connection having a widened pipe and clamping ring from FIG. 4.
Figure 6:
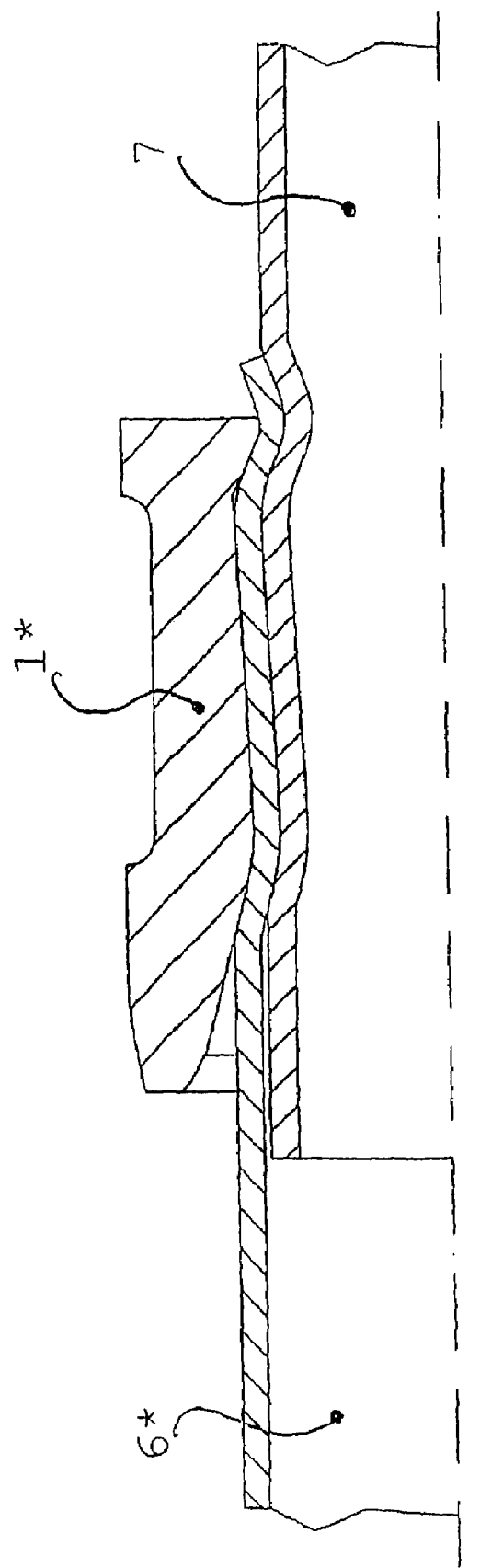
FIG. 6: pipe connection having pipes of different diameter with clamping ring from FIG. 4.

The wave-shaped deformation of the pipes 6, 6* and 7* is clearly evident in FIGS. 5 and 6. Here again, the pipes are deformed elastically, to a great extent, in the center region 3*, while plastic deformation prevails in the end region 4.

The clamping ring 1* having a widening center segment 3* is also suitable for joining pipes having the same diameter 6, 7, of which the outer pipe 6 is widened (cf. FIG. 5), as well as for joining pipes having different diameter 6* and 7; cf. FIG. 6.

The invention claimed is:

1. A pipe connection having a metallic clamping ring, which, for the purpose of connecting two metallic pipes that have been inserted one into the other, can be pushed axially onto the pipe that lies on the outside, whereby the clamping ring, on its inside,
   a) has an entry segment that narrows radially and conically, counter to the push-on direction,
   b) has an end segment that narrows radially and conically, counter to the push-on direction, which segment brings about radial compression of the pipes, in the assembled position, and
   c) has a center segment connecting the entry segment and end segment,
wherein
   d) the center segment widens radially and conically counter to the push-on direction,
   wherein the entry segment is, in turn, divided into two consecutive partial segments that narrow radially and conically counter to the push-on direction, whereby the first partial segment, disposed on the opening side, has a greater incline than the second partial segment.

2. The pipe connection according to claim 1, wherein on its outside, in the region of the center segment, the clamping ring has a circumferential constriction.

* * * * *